United States Patent
Ghosh et al.

(10) Patent No.: US 8,645,501 B2
(45) Date of Patent: Feb. 4, 2014

(54) ADAPTIVE DNS PRE-FETCHING

(75) Inventors: Donna Ghosh, San Diego, CA (US);
Mark Bapst, South Barrington, IL (US);
Christopher G. Lott, San Diego, CA (US); Rashid A. Attar, San Diego, CA (US); George Cherian, San Diego, CA (US); Linhai He, San Diego, CA (US);
Dinesh K. Garg, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 229 days.

(21) Appl. No.: 13/101,520

(22) Filed: May 5, 2011

(65) Prior Publication Data
US 2012/0284372 A1    Nov. 8, 2012

(51) Int. Cl.
*G06F 15/16*    (2006.01)

(52) U.S. Cl.
USPC ........... 709/219; 709/227; 709/245; 709/224; 709/217; 709/203

(58) Field of Classification Search
USPC ................ 709/227, 245, 224, 217–219, 203
See application file for complete search history.

(56) References Cited

U.S. PATENT DOCUMENTS

| | | | |
|---|---|---|---|
| 7,222,356 B1 | 5/2007 | Yonezawa et al. | |
| 7,840,911 B2 | 11/2010 | Milener et al. | |
| 2003/0033384 A1 | 2/2003 | Nishizawa et al. | |
| 2005/0138143 A1 | 6/2005 | Thompson | |
| 2005/0198191 A1 | 9/2005 | Carlson et al. | |
| 2006/0069618 A1 | 3/2006 | Milener et al. | |
| 2006/0294223 A1 | 12/2006 | Glasgow et al. | |
| 2007/0013708 A1 | 1/2007 | Barcklay et al. | |
| 2007/0213101 A1 | 9/2007 | Oh et al. | |
| 2007/0226646 A1 | 9/2007 | Nagiyama et al. | |
| 2008/0228864 A1 | 9/2008 | Plamondon | |
| 2010/0049872 A1 | 2/2010 | Roskind | |
| 2010/0144326 A1 | 6/2010 | Wilhelmsson | |
| 2012/0007876 A1 | 1/2012 | Hymel | |
| 2012/0084343 A1 | 4/2012 | Mir et al. | |
| 2012/0191862 A1* | 7/2012 | Kovvali et al. ................. | 709/227 |
| 2013/0055395 A1 | 2/2013 | Milener et al. | |

OTHER PUBLICATIONS

Siegel, Brandon, "DNS Prefetch 1.1.0", Webpage located at https://addons.mozilla.org/en-US/firefox/addon/dns-prefetch downloaded Dec. 7, 2012, Apr. 13, 2009, Publisher: Mozilla Published in: US, pp. 3.
"The Chromium Projects", webpage located at http://dev.chromium.org/developers/design-documents/dns-prefetching downloaded Dec. 7, 2012, Publisher: Google Sites, Published in: US, pp. 4.
International Preliminary Report on Patentability—PCT/US2011/049843, The International Bureau of WIPO—Geneva, Switzerland—Sep. 13, 2012.

* cited by examiner

*Primary Examiner* — Wing F Chan
*Assistant Examiner* — Benjamin M. Thieu
(74) *Attorney, Agent, or Firm* — Neugeboren O'Dowd PC

(57) ABSTRACT

Methods and apparatus for obtaining web content are disclosed. The method includes identifying resources identified by domain name references that a user may request, obtaining a status of at least one operating condition that affects operations of the communication device, fetching, in advance of the user requesting the content, network addresses of the resources so as to resolve the domain name references, and adapting a level of the fetching based upon the at least one operating condition. The network addresses of the resources are cached so as to generate cached network addresses, and if the user requests the content, the cached network addresses are utilized to access the resources associated with the content.

10 Claims, 4 Drawing Sheets

ADAPTIVE DNS PRE-FETCHING

FIELD OF THE INVENTION

The present invention generally relates to communication devices. In particular, but not by way of limitation, the present invention relates to communications between a communication device and a network to obtain web content.

BACKGROUND OF THE INVENTION

The Internet is a global system of interconnected computer networks that use an Internet Protocol to serve billions of users worldwide. It is a network of networks that consists of millions of private, public, academic, business, and government networks, of local to global scope, that are linked by a broad array of electronic, wireless and optical networking technologies.

An Internet Protocol address (IP address) is a numerical label assigned to each device (e.g., computer, smartphone, server, printer) participating in a computer network that uses the Internet Protocol for communication. An IP address serves two principal functions: host (or network interface) identification and location addressing.

IP addresses, however, are numeric addresses that are not easy for people to use and remember. As a consequence, a Domain Name System (DNS) was developed to translate human-friendly computer hostnames into IP addresses. Users take advantage of this when they recite meaningful Uniform Resource Locators (URLs) and e-mail addresses without having to know how the computer actually locates them.

In addition, the DNS system makes it possible to assign domain names to groups of Internet resources and users in a meaningful way, independent of each entity's physical location. Because of this, World Wide Web (WWW) hyperlinks and Internet contact information can remain consistent and constant even if the current Internet routing arrangements change or the participant uses a mobile device. The Domain Name System also stores other types of information, such as the list of mail servers that accept email for a given Internet domain. By providing a worldwide, distributed keyword-based redirection service, the Domain Name System is an essential component of the functionality of the Internet.

The Domain Name System distributes the responsibility of assigning domain names and mapping those names to IP addresses by designating authoritative name servers for each domain. Authoritative name servers are assigned to be responsible for their particular domains, and in turn can assign other authoritative name servers for their sub-domains.

When users request content via the Internet with the user-friendly URLs, a DNS query is initiated that sends a request to a name server, and the name server returns IP addresses for the content associated with the domain. This process of translating domain names to IP addresses (also referred to as DNS resolution), however, may be a significant fraction of the time it takes to download a webpage. As a consequence, techniques have been developed to prefetch IP addresses for content before a user actually requests the content. In this way, when the user requests the content, the DNS resolution has already been performed.

Performing DNS prefetching, however, may adversely affect performance of the device that is accessing the content. For example, known DNS prefetching operations utilize a substantial amount of power that may especially affect the use of mobile devices. In addition, DNS prefetching may actually delay the transmissions of other traffic that is needed to render a webpage; thus degrading webpage download time. As a consequence, existing DNS prefetching techniques are often unsatisfactory and are potentially counterproductive.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

In accordance with several embodiments, the invention may be characterized as a method for obtaining web content on a communication device. The method in this embodiment includes identifying resources associated with content that a user may request, and obtaining a status of at least one operating condition that affects operations of the communication device. In addition, in advance of the user requesting the content, network addresses of the resources are fetched so as to resolve the domain name references, and a level of the prefetching is adapted based upon the at least one operating condition. The network addresses of the resources are cached, and if the user requests the content, the cached network addresses are used to access the resources associated with the content.

Other embodiments may be characterized as a mobile device that includes an application that enables a user to request web content that includes resources residing on at least one remote server. In addition, the mobile device includes a domain name system (DNS) prefetch manager that requests, before the user requests the web content, network addresses of the resources that are identified by domain name references. A transmitter is configured to transmit the requests for the network addresses to a remote server that initiates a translation of the domain name references to the network addresses, and a receiver to receive the network addresses via a reverse communication link. In addition, an adaptive DNS module is configured to receive information about at least one operating condition that affects operations of the mobile device and control the DNS prefetch manager so the DNS prefetch manager alters a level of the requests for the network addresses based upon the at least one operating condition.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In general, several embodiments of the present invention are directed to adapting DNS prefetching operations on a communication device to one or more operating conditions so as to provide the benefits of DNS prefetching (e.g., reduced user-perceived latency) while reducing any unintended adverse consequences from the prefetching operations. For instance, the level of DNS prefetching operations may be adapted to the network conditions so that the DNS perfecting does not interfere with other important communication traffic. For example, if a data rate to the communication device falls below one or more thresholds (e.g., because a WiFi network is unavailable and/or an estimated reverse link ("RL") rate is low), DNS prefetching operations are reduced or eliminated altogether so as to prevent the DNS prefetching from interfering with other communications that are more critical to a user's experience and/or more critical to other operations on the communication device.

As another example, the level of DNS prefetching may be adapted to a level of available power on the communication device so that the DNS prefetching is reduced as the available power on the communication falls (e.g., below one or more thresholds).

And in some implementations, DNS prefetching operations are assigned a priority based upon operating conditions (e.g., network conditions and/or power conditions) so that DNS prefetching takes a lower priority relative to other RL traffic (e.g., HTTP GETS, TCP ACKS) so that the DNS prefetching does not interfere with other operations that are more critical to maintaining a desirable user-experience.

Figure 1:
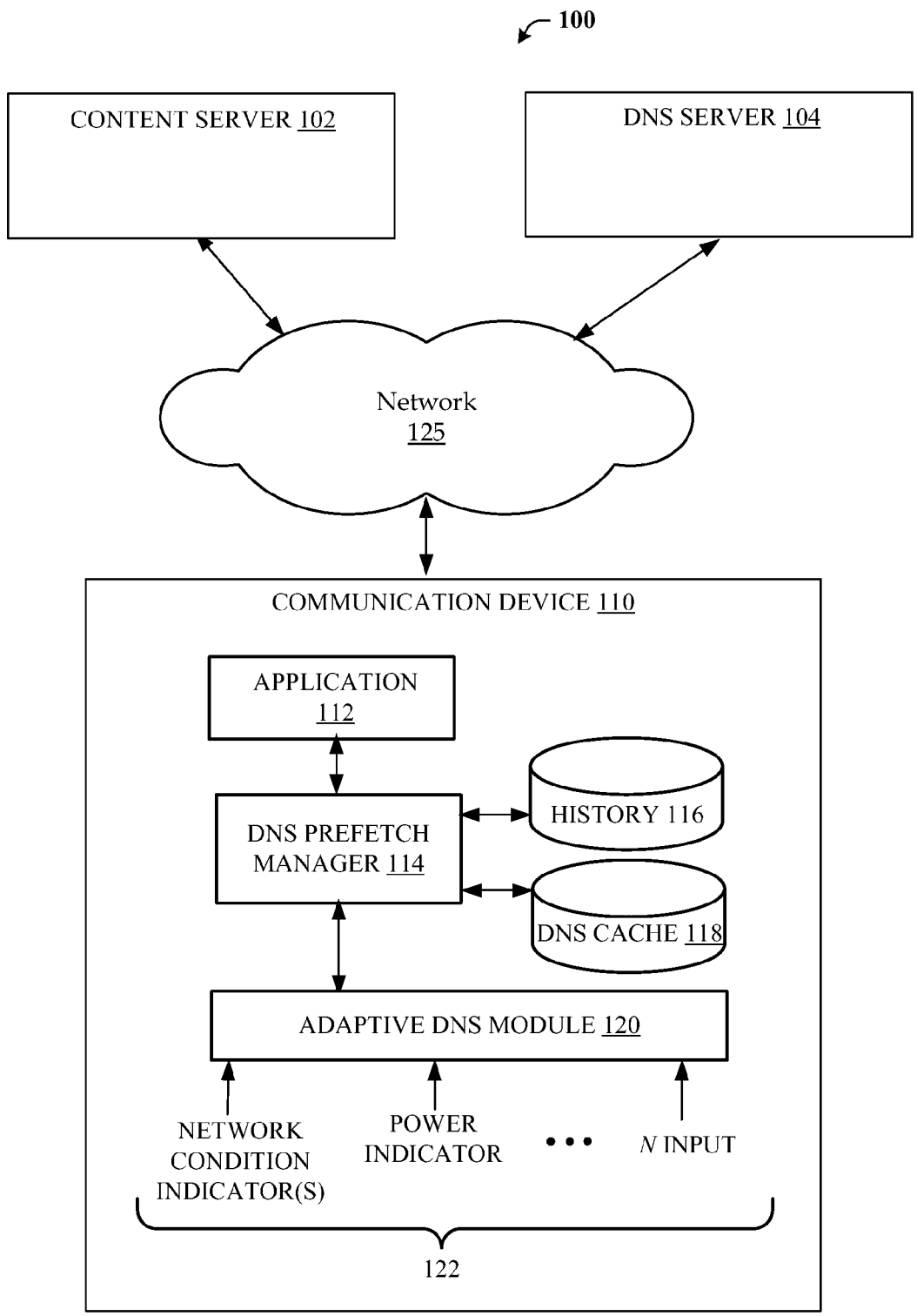
FIG. 1 is a block diagram of a communication network according to several embodiments of the present invention.

Referring first to FIG. 1 for example, shown is a block diagram depicting an exemplary communication network 100 in which many embodiments of the present invention may be implemented. As shown, the communication network 100 includes a remote server depicted as a content server 102 and a DNS server 104 in communication with a communication device 110 via a network 125.

The content server 102 generally represents one or more remote servers that operate to serve content (e.g., web content) that is requested by the communication device 110 (and potentially many other devices) via the network 125. The network 125 may include the Internet, local area networks, cellular networks (e.g., a CDMA network, a GPRS network, a UMTS networks), and other types of communication networks.

Webpages, as one of ordinary skill in the art will appreciate, typically include main pages and resources (e.g., objects) that are constituent elements the main page. In many instances for example, each webpage may include over one hundred objects including text, images, audio content, animation, video, and other content, which may be distributed over several separate servers that are in communication via the network 125. And as one of ordinary skill in the art will appreciate, the resources that are associated with a particular webpage are discovered by parsing the webpage to obtain the URLs of the resources.

The DNS server 104 represents one or more DNS servers that generally operate as part of the Domain Name System (DNS) to provide IP addresses of webpages and resources to the communication device 110 responsive to requests from the communication device 110. For simplicity, the distributed nature of the DNS system is not depicted in FIG. 1, but one of ordinary skill in the art will appreciate that the DNS system includes several distributed servers that operated collectively to translate addresses from the domain name hierarchy namespace to IP address namespace responsive to DNS queries.

Generally, the communication device 110 enables a user to retrieve content from the content server 102, and the communication device 110 may be realized by a wireless communications device (WCD) such as a smartphone, PDA, netbook, laptop computer and other wireless devices. But the communication device 110 may work in tandem with wireline and wireless communication devices.

More specifically, the communication device 110 in this embodiment includes an application 112 that is adapted to request content from the content server 102. The application 112 may be realized by any of a variety of applications that access content from the content server 102 including web browsers, weather apps, navigation apps, gaming apps, financial apps, educational apps, and utility apps. For simplicity, the constituent components that may be utilized by the application 112 to access the network 125 and process content from the content server 102 (e.g., network interface, resource loaders, HTML parsers, rendering, layout, JavaScript engines, etc.) are not depicted, but these components are well known those of ordinary skill in the art.

Also depicted in communication with the application 112 is a DNS prefetch manager 114 that is in communication with a history store 116, a DNS cache 118, and an adaptive DNS module 120. The DNS prefetch manager 114 generally functions to resolve domain names, and store the associated IP addresses in the DNS cache 118, before a user of the communication device 110 attempts to access content that is associated with the domain names. As a consequence, when a user (e.g., using application 112) does navigate to domain names that have already been resolved, the user need not wait for the application 112 to communicate with the DNS server 104 to resolve the domain names.

In some embodiments, the DNS prefetch manager 114 preemptively resolves domain names of frequently accessed URLs that are identified by accessing the history store 116, which includes a history of previously accessed URLs. The history store 116 may include a history store that is utilized by a browser and/or another history store that may be maintained by the DNS prefetch manager 114. In addition, the DNS prefetch manager 114 may preemptively resolve domain names of links in a webpage that a user is viewing so that if the user navigates to one of the links, the domain names of the links are already resolved.

Also shown is an adaptive DNS module 120 that generally operates to adapt the operations of the DNS prefetch manager 114 to one or more conditions that affect the communication device 110. For example, the adaptive DNS module 120 alters the operation of the DNS prefetch manager 114 when DNS prefetch operations would adversely affect operation of the communication device 110.

As shown, the adaptive DNS module 120 may receive N inputs 122 (where N is one or more) that are indicative of environmental or on-device conditions. For example, the adaptive DNS module 120 may receive one or more inputs that are indicative of network conditions that the communication device 110 is operating under, and may include an indication of available power that remains on the communication device 110.

For example, when a data rate to the communication device 110 is low, the DNS prefetch operations may delay other communication traffic (e.g., HTTP GETS and TCP ACK communications) that are more critical to maintaining a quality user experience (e.g., maintaining a relatively low HTTP page down load time). As a consequence, the adaptive DNS module 120 may utilize one or more indicators of network conditions, which may include a rate that data is received at the communication device 110. For example, a network condition indicator may be an indicator of an estimated reverse link (RL) rate of a 3G or 4G cellular network that is utilized by the communication device 110. Another network condition indicator may also be an indicator of whether the communication device 110 is utilizing a WiFi network and/or may include an indicator of download rates of the WiFi network.

Moreover, the adaptive DNS module 120 may assign a priority to DNS prefetch operations based upon the indicator(s) of network conditions to the adaptive DNS module 120 so that relative to other traffic that is more important to the quality of the user's experience and/or operation of the communication device 110, the DNS operations are subordinated. For example, if a reverse link rate is very low, the adaptive DNS module 120 may assign a priority level to the DNS prefetching operations that is lower than a priority of HTTP GET and TCP ACK traffic.

Figure 2:
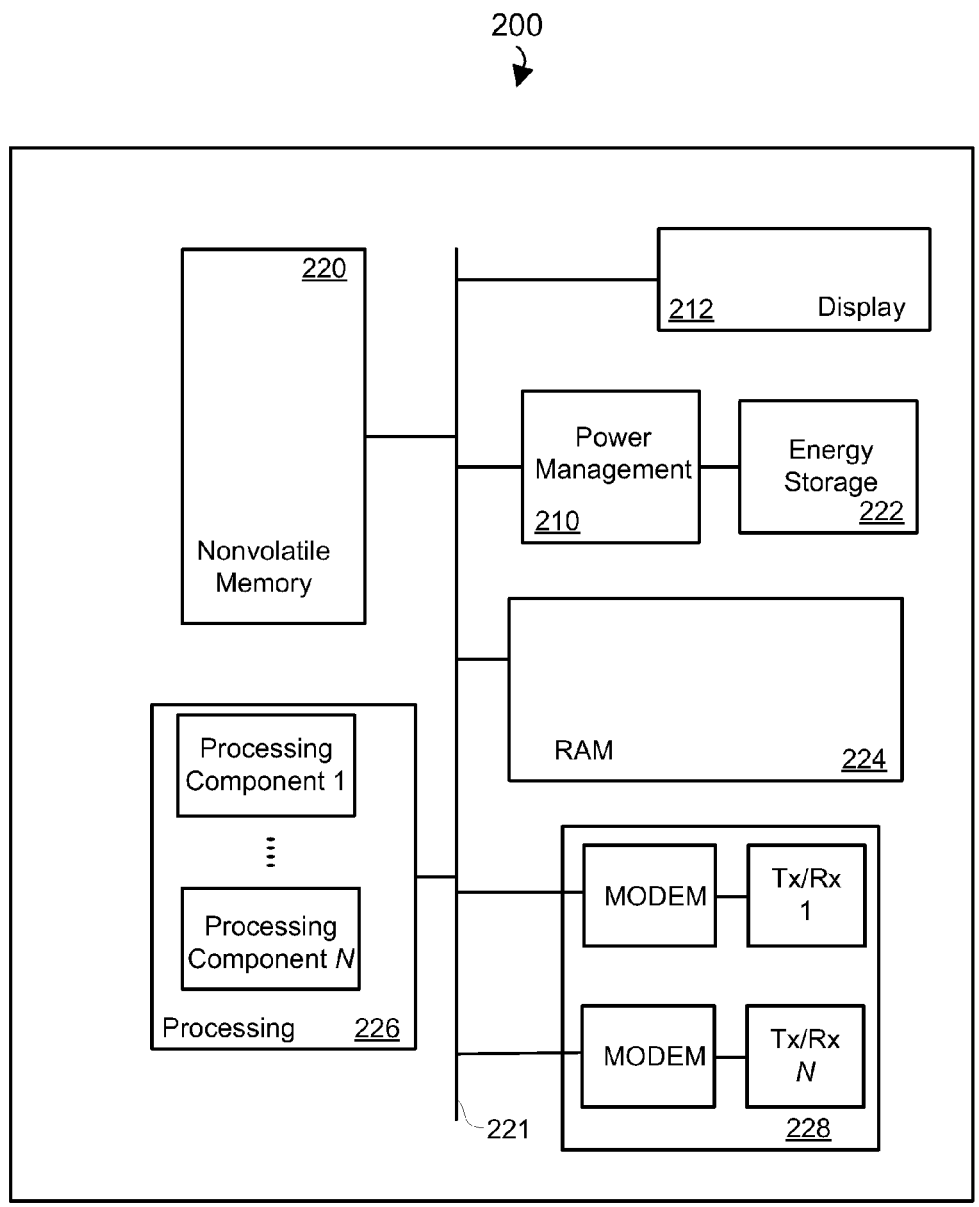
FIG. 2 is a block diagram depicting physical components of an exemplary communication device.

Referring next to FIG. 2, shown is a block diagram depicting physical components of an exemplary embodiment of a mobile device 200. As shown, a power management component 210, display portion 212, and nonvolatile memory 220 are coupled to a bus 221 that is also coupled to random access memory ("RAM") 224, a processing portion (which includes N processing components) 226, and a transceiver component 228. Also shown is an energy storage portion 222 that is coupled to the power management component 210. Although the components depicted in FIG. 2 represent physical components of the mobile device 200, FIG. 2 is not intended to be a hardware diagram; thus many of the components depicted in FIG. 2 may be realized by common constructs or distributed among additional physical components. Moreover, it is certainly contemplated that other existing and yet-to-be developed physical components and architectures may be utilized to implement the functional components described with reference to FIG. 1.

In general, the nonvolatile memory 220 functions to store (e.g., persistently store) data and executable code including code that is associated with the functional components depicted in FIG. 1. In some embodiments for example, the nonvolatile memory 220 includes bootloader code, modem software, operating system code, file system code, and processor-executable code to facilitate the implementation of one or more portions of the application 112, DNS prefetch manager 114, history store 116, and adaptive DNS module 120 described with reference to FIG. 1.

In many implementations, the nonvolatile memory 220 is realized by flash memory (e.g., NAND or ONENAND™ memory), but it is certainly contemplated that other memory types may be utilized as well. Although it may be possible to execute the code from the nonvolatile memory 220, the executable code in the nonvolatile memory 220 is typically loaded into RAM 224 and executed by one or more of the N processing components 226.

The power management component 210 in the embodiment depicted in FIG. 2 generally operates to provide the power indicator input to the adaptive DNS module 120 described with reference to FIG. 1, and the power indicator may include power capability information based upon a status of the energy storage portion 222. In addition, the power management component 210 may operate as a power source to regulate the application of power to hardware components of the mobile device 200 and regulate charging of the energy storage portion 222. In many implementations the energy storage portion 222 includes one or more rechargeable batteries (e.g., lithium-ion batteries), but it is certainly contemplated that the energy storage portion 222 may include other types of energy storage technologies (e.g., fuel cell or other technologies). The power capability information may include an indication of the amount of energy (e.g., in milliampere-hours (mAh)) that is available in the energy storage portion 222.

The N processing components 226 in connection with RAM 224 generally operate to execute the instructions stored in nonvolatile memory 220 to effectuate functional components depicted in FIG. 1. As one of ordinarily skill in the art will appreciate, the processing components 226 may include a video processor, modem processor, DSP, graphics processing unit (GPU), and other processing components.

The depicted transceiver component 228 includes N transceiver chains, which may be used in connection with the application 112 to communicate with the content server 102 via the network 125. As shown, each of the N transceiver chains includes transceiver components and a modem, and each transceiver chain represents a transceiver associated with a particular communication scheme. For example, one transceiver chain may operate according to wireline protocols, another transceiver may communicate according to WiFi communication protocols (e.g., 802.11 protocols), another may communicate according to cellular protocols (e.g., CDMA or GSM protocols), and yet another may operate according to Bluetooth protocols. Although the N transceivers are depicted as a unitary transceiver component 228 for simplicity, it is certainly contemplated that the transceiver chains may be separately disposed about the mobile device 200. In some embodiments, one or more of the modems provides the network condition indicator(s) that are input to the adaptive DNS module 120. For example, one or more of the modems may provide an estimate of the reverse link rate to the adaptive DNS module 120 and an indicator of the network conditions.

The display 212 generally operates to provide visual images to a user that may include a user interface and content that is received in connection with many embodiments of the present invention. Although not depicted for clarity, one of ordinary skill in the art will appreciate that other components including a display driver and backlighting (depending upon the technology of the display) are also associated with the display 212.

Figure 3:
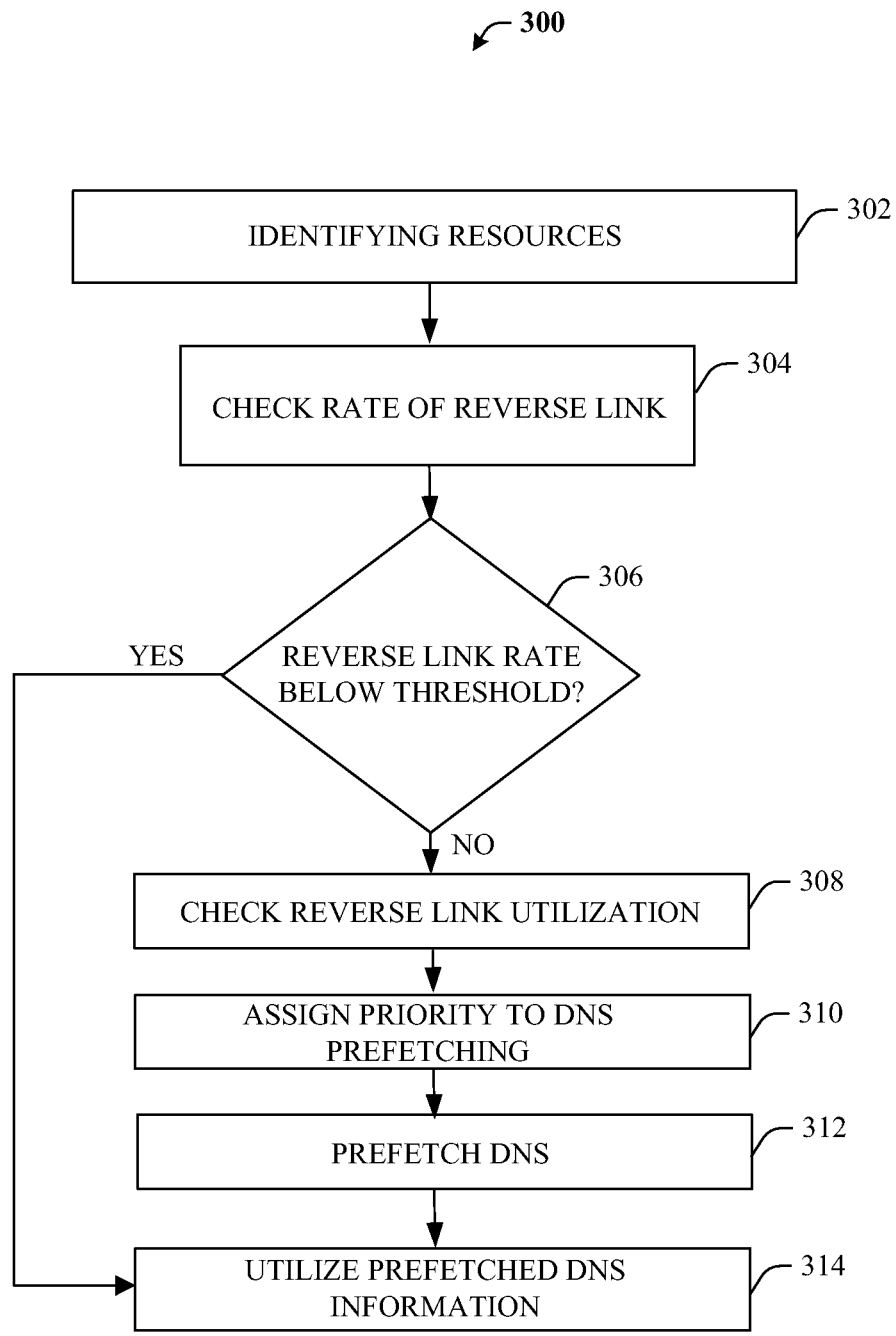
FIG. 3 is a flowchart depicting an exemplary method.

Referring next to FIG. 3, it is a flowchart 300 depicting a method that may be traversed in connection with the embodiments described with reference to FIGS. 1 and 2. Although reference is made to FIG. 1 and/or FIG. 2 as examples of the components that may be utilized to carry out the method depicted in FIG. 3, the method is certainly not limited to the embodiments of FIGS. 1 and 2.

As shown, before content is obtained from the content server 102, the application 112 identifies resources that are associated with content located at the remote server 102 (Block 302). In the context of implementations where the application 112 is realized by a web browser, an initial request may be needed to obtain a main web page, which is then parsed to identify resources that are necessary to render the webpage. But if the application 112 is realized by an app, the list of resources may already be available on the communication device 110 (e.g., the resources may be stored in association with the application 112 in nonvolatile memory 220).

As shown, before DNS prefetching (Block 312) is carried out, a rate of the reverse link is checked (Block 304) to determine if the rate of the reverse link is below one or more thresholds (Block 306) and a utilization of the reverse link is checked to determine whether a utilization of the reverse link (by traffic other than DNS prefetching) exceeds one or more thresholds (Block 308). In many modes of operation, the check of the reverse link rate (Block 304) is utilized to determine whether DNS prefetching (Block 312) is an option at all. For example, if the reverse link rate is below a particular level, even if there is no other traffic, DNS prefetching (Block 312) may not be a viable option at all.

In contrast to the check of the reverse link rate (Block 304), the check of the reverse link utilization (Block 308) provides an indication of whether other traffic exists on the reverse link. For example, the reverse link rate may be sufficient to enable DNS prefetching, but traffic other than DNS prefetching may occupy a large percentage of the reverse link rate, and as a consequence, DNS prefetching may adversely affect the rate of the other traffic. For example but not by way of limitation, if the reverse link rate is 500 kbps and the reverse link utilization indicates that traffic other than DNS prefetching accounts for 495 kbps, DNS prefetching (Block 312) may interfere with other traffic that is more preferable to maintain than the DNS prefetching.

As a consequence, in the method depicted in FIG. 3 (and in many variations of this method) a priority is assigned to DNS prefetching relative to other traffic (Block 310). In some modes of operation, the priority that is assigned to the DNS prefetching is assigned based upon a status of the reverse link (e.g., the reverse link rate and/or utilization of the available rate). In some implementations, for example, DNS prefetching is not constrained by any priorities when the reverse link has relatively little traffic and is limited (e.g., by traffic priority) when the reverse link is heavily utilized so that DNS prefetching may, to a certain extent, level the load (e.g., fill in gaps of low utilization) on the reverse link.

As shown, DNS prefetching is carried out (Block 312) based upon any prioritization that is applied to the prefetching, and the prefetched DNS information is then used to obtain the requested content (Block 314).

Figure 4:
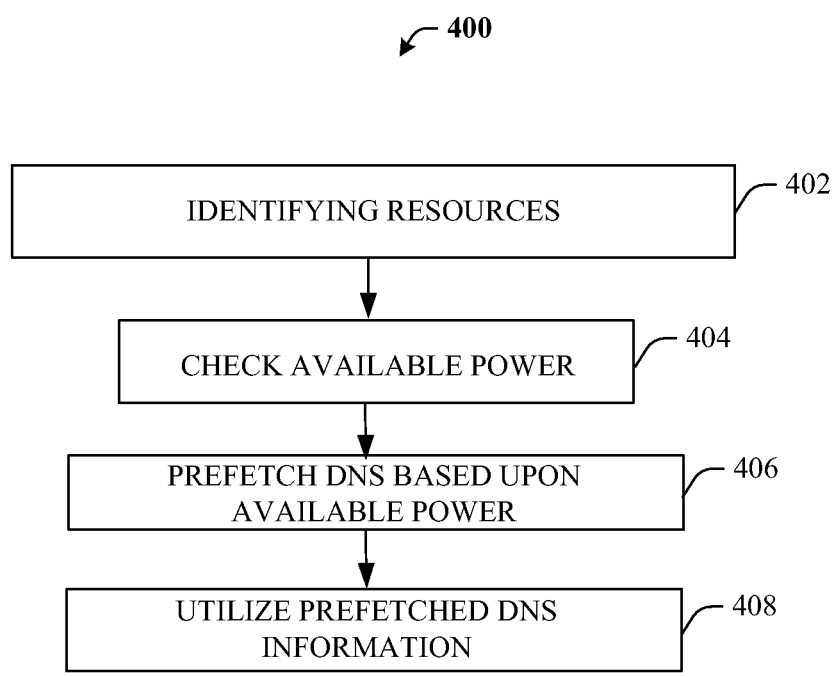
FIG. 4 is a flowchart depicting another method.

Referring next to FIG. 4, it is a flowchart 400 depicting another method that may be traversed in connection with the embodiments described with reference to FIGS. 1 and 2. Although the method depicted in FIG. 4 is separately depicted from the method described with reference to FIG. 3, the two depicted methods are certainly not mutually exclusive.

As shown, in this method, as in the method described with reference to FIG. 3, before content is obtained from the content server 102, the application 112 identifies resources that are associated with content located at the remote server 102 (Block 402). But in this method, an availability of power to the communication device 110 is obtained (Block 404), and DNS prefetching operations are carried out based upon the power that is available to the communication device 110 (Block 406). And the prefetched DNS information is utilized to obtain content if the content is requested (Block 408).

In some implementations, the number of DNS prefetch queries that are sent varies in a general relation to the level of available power. For example, if the communication device 110 is connected to an external power supply (that provides substantially unlimited power), DNS queries may be preemptively performed without constraint, but if the external power supply is removed, the number of DNS queries that are performed may be reduced as the available power falls. And in some variations, once the available power falls to a threshold level, no further DNS queries are preemptively performed. For example without limitation, once the available power on the communication device 110 reaches 25% of capacity, no further preemptive DNS queries are carried out. Again, the 25% threshold is merely an example and it is certainly contemplated that other thresholds may be utilized, and that the threshold(s) may be configurable.

As discussed, the method depicted in FIG. 4 is not mutually exclusive with the method previously described with reference to FIG. 3. For example, in some instances, even if the communication device 110 is at, or near, 100% of available power, the reverse link data rate may be low enough such that unconstrained DNS prefetching may interfere with other important traffic. As a consequence, DNS prefetching may be reduced or omitted completely regardless of power level.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for obtaining web content on a communication device, the method comprising:
   identifying resources associated with content that a user may request, the resources residing on at least one remote server, the locations of the resources being identified by domain name references;
   obtaining a status of at least one operating condition that affects operations of the communication device, the at least one operating condition including a reverse link data rate;
   assigning a priority to prefetching network addresses of the resources relative to other reverse link traffic operations;
   fetching, in advance of the user requesting the content, the network addresses of the resources to resolve the domain name references;
   adapting the priority of the prefetching relative to the other reverse link traffic operations based upon changes to the reverse link data rate and an estimate of a utilization, by traffic other than the network addresses of the resources that are fetched in advance, of an available data rate of the reverse link;
   caching the network addresses of the resources to generate cached network addresses; and
   utilizing, if the user requests the content, the cached network addresses to access the resources associated with the content.

2. The method of claim 1, wherein obtaining a status of at least one operating condition includes obtaining information about an availability of power to the communication device.

3. The method of claim 1, wherein identifying resources associated with content that the user may request includes:
   accessing a history of webpages previously visited by the user to identify at least one frequently visited webpage;
   requesting a main page of the at least one frequently visited webpage; and
   parsing the main page to identify resources associated with the main page.

4. A mobile device, the mobile device comprising:
   an application that enables a user to request web content, the web content including resources residing on at least one remote server, the locations of the resources being identified by domain name references;
   a domain name system (DNS) prefetch manager that requests, before the user requests the web content, network addresses of the resources that are identified by the domain name references;

a transmitter configured to transmit the requests for the network addresses to a remote server that initiates a translation of the domain name references to the network addresses;

a receiver to receive the network addresses via a reverse communication link; and an adaptive DNS module that is configured to:
receive an indication of an available data rate of the reverse communication link;
receive an estimate of a utilization of the available data rate by reverse link traffic operations other than the network addresses of the resources that are fetched in advance;
prioritize, relative to the other reverse link traffic operations, the requests for the network addresses of the resources based upon the available data rate and the utilization of the available data rate by the other reverse link operations; and
control the DNS prefetch manager so the DNS prefetch manager alters a level of the requests for the network addresses based upon the prioritization.

5. The mobile device of claim 4, including:
a power management component that provides an indication of a level of power that is available to the mobile device;
wherein the adaptive DNS module is configured to control the DNS prefetch manager based upon the level of power that is available to the mobile device so that the DNS prefetch manager requests fewer network addresses of the resources before the user requests the web content.

6. The mobile device of claim 5, wherein the adaptive DNS module is configured to control the DNS prefetch manager so that the DNS prefetch manager ceases to request, when the level of power that is available drops below a threshold, network addresses of the resources before the user requests the web content.

7. A mobile device comprising:
means for identifying resources associated with content that a user may request, the resources residing on at least one remote server, the locations of the resources being identified by domain name references;
means for obtaining a status of at least one operating condition that affects operations of the communication device, the at least one operating condition including a reverse link data rate;
means for assigning a priority to prefetching network addresses of the resources relative to other reverse link traffic operations;
means for fetching, in advance of the user requesting the content, the network addresses of the resources to resolve the domain name references;
means for adapting the priority of the prefetching relative to the other reverse link traffic operations based upon changes to the reverse link data rate and an estimate of a utilization, by traffic other than the network addresses of the resources that are fetched in advance, of an available data rate of the reverse link;
means for caching the network addresses of the resources to generate cached network addresses; and
means for utilizing, if the user requests the content, the cached network addresses to access the resources associated with the content.

8. The mobile device of claim 7, wherein obtaining a status of at least one operating condition includes obtaining information about an availability of power to the mobile device.

9. A non-transitory, tangible computer readable storage medium, encoded with processor readable instructions to perform a method for obtaining web content on a mobile device, the method comprising:
identifying resources associated with content that a user may request, the resources residing on at least one remote server, the locations of the resources being identified by domain name references;
obtaining a status of at least one operating condition that affects operations of the communication device, the at least one operating condition including a reverse link data rate;
assigning a priority to prefetching network addresses of the resources relative to other reverse link traffic operations;
fetching, in advance of the user requesting the content, the network addresses of the resources to resolve the domain name references;
adapting the priority of the prefetching relative to the other reverse link traffic operations based upon changes to the reverse link data rate and an estimate of a utilization, by traffic other than the network addresses of the resources that are fetched in advance, of an available data rate of the reverse link;
caching the network addresses of the resources to generate cached network addresses; and
utilizing, if the user requests the content, the cached network addresses to access the resources associated with the content.

10. The non-transitory, tangible computer readable storage medium of claim 9, wherein obtaining a status of at least one operating condition includes obtaining information about an availability of power to the mobile device.

* * * * *